(12) United States Patent
Krishnaraj et al.

(10) Patent No.: US 9,152,318 B2
(45) Date of Patent: Oct. 6, 2015

(54) GALLERY APPLICATION FOR CONTENT VIEWING

(75) Inventors: Venkat Krishnaraj, San Francisco, CA (US); Austin W. Shoemaker, Mountain View, CA (US); Aditya Rathnam, Palo Alto, CA (US); Soujanaya Bhumkar, Palo Alto, CA (US)

(73) Assignee: YAHOO! INC., Sunnyvale, CA (US)

( * ) Notice: Subject to any disclaimer, the term of this patent is extended or adjusted under 35 U.S.C. 154(b) by 312 days.

(21) Appl. No.: 12/702,508

(22) Filed: Feb. 9, 2010

(65) Prior Publication Data
US 2011/0126156 A1    May 26, 2011

Related U.S. Application Data

(60) Provisional application No. 61/283,092, filed on Nov. 25, 2009.

(51) Int. Cl.
*G06F 3/048* (2013.01)
*G06F 3/01* (2006.01)
*G06F 17/30* (2006.01)
(Continued)

(52) U.S. Cl.
CPC ............ *G06F 3/04883* (2013.01); *G06F 3/016* (2013.01); *G06F 3/0485* (2013.01); *G06F 3/04817* (2013.01); *G06F 17/3028* (2013.01);
(Continued)

(58) Field of Classification Search
CPC . G06F 3/0482; G06F 3/04817; G06F 3/0485; G06F 3/04855

USPC .......................................... 715/848, 977, 787
See application file for complete search history.

(56) References Cited

U.S. PATENT DOCUMENTS 5,675,358 A * 10/1997 Bullock et al. ................ 345/420
5,898,434 A     4/1999 Small et al.
(Continued)

FOREIGN PATENT DOCUMENTS

EP     1 645 950 A1    4/2006
JP     2005-223854 A   8/2005
(Continued)

OTHER PUBLICATIONS

European Patent Office, European Search Report and Opinion, European Patent Application No. 10833788.2, Jul. 15, 2013, seven pages.
(Continued)

*Primary Examiner* — Nicholas Ulrich
(74) *Attorney, Agent, or Firm* — James J. DeCarlo; Greenberg Traurig, LLP

(57) ABSTRACT

A gallery software application enables a user to browse, view, and interact with various content items, such as still images and videos. The gallery includes a graphical user interface with two modes: stack and grid. In stack mode, images (which represent content items) are divided into groups, and a group is represented by a displayed stack of images. In grid mode, images are displayed in a grid of rows and columns. The displayed stacks and images can be scrolled. When the scrolling reaches the end of a set of stacks or images, the last stack or image is displayed with perspective distortion. In grid mode, a value is displayed for meta-data of a content item that is not currently displayed. If a user indicates the displayed value, the grid is scrolled until the content item whose meta-data matches that value is displayed.

19 Claims, 20 Drawing Sheets
(19 of 20 Drawing Sheet(s) Filed in Color)

(51) Int. Cl.
  *G06F 3/0488* (2013.01)
  *G06F 3/0481* (2013.01)
  *G06F 3/0485* (2013.01)

(52) U.S. Cl.
  CPC *G06F 17/30274* (2013.01); *G06F 2203/04804* (2013.01)

(56) References Cited

U.S. PATENT DOCUMENTS

| | | | |
|---|---|---|---|
| 6,654,506 | B1 | 11/2003 | Luo et al. |
| 6,968,511 | B1 | 11/2005 | Robertson et al. |
| 6,973,222 | B2 | 12/2005 | Haeberli |
| 7,082,211 | B2 | 7/2006 | Simon et al. |
| 7,198,137 | B2 | 4/2007 | Olien |
| 7,257,571 | B2 | 8/2007 | Turski et al. |
| 7,446,784 | B2 | 11/2008 | Crew et al. |
| 7,469,381 | B2 * | 12/2008 | Ording ............... 715/702 |
| 7,581,195 | B2 | 8/2009 | Sciammarella et al. |
| 7,631,253 | B2 | 12/2009 | Hertzfeld et al. |
| 7,636,489 | B2 | 12/2009 | Zimmer |
| 7,643,686 | B2 | 1/2010 | Kraus et al. |
| 7,667,717 | B2 | 2/2010 | Baudisch |
| 7,714,924 | B2 | 5/2010 | Tanaka et al. |
| 7,719,548 | B2 | 5/2010 | Ubillos et al. |
| 7,747,625 | B2 | 6/2010 | Gargi et al. |
| 7,839,420 | B2 | 11/2010 | Ubillos |
| 7,853,895 | B2 | 12/2010 | Tu |
| 7,860,866 | B2 | 12/2010 | Kim et al. |
| 7,948,502 | B2 | 5/2011 | Stanton |
| 8,253,707 | B2 | 8/2012 | Kaneko et al. |
| 8,266,550 | B1 * | 9/2012 | Cleron et al. ............ 715/863 |
| 8,812,985 | B2 * | 8/2014 | Akella ............... 715/830 |
| 2002/0140746 | A1 | 10/2002 | Gargi |
| 2002/0167546 | A1 * | 11/2002 | Kimbell et al. ............ 345/790 |
| 2002/0186252 | A1 * | 12/2002 | Himmel et al. ............ 345/787 |
| 2003/0194148 | A1 | 10/2003 | Haeberli |
| 2003/0223622 | A1 | 12/2003 | Simon et al. |
| 2004/0135817 | A1 | 7/2004 | Daughtery et al. |
| 2004/0193621 | A1 | 9/2004 | Moore et al. |
| 2005/0027712 | A1 | 2/2005 | Gargi et al. |
| 2005/0210403 | A1 * | 9/2005 | Satanek ............... 715/786 |
| 2005/0210416 | A1 * | 9/2005 | MacLaurin et al. .......... 715/851 |
| 2005/0283742 | A1 * | 12/2005 | Gusmorino et al. .......... 715/839 |
| 2006/0071947 | A1 | 4/2006 | Ubillos et al. |
| 2006/0150104 | A1 | 7/2006 | Lira |
| 2006/0161868 | A1 * | 7/2006 | Van Dok et al. ............ 715/835 |
| 2006/0184901 | A1 * | 8/2006 | Dietz ............... 715/855 |
| 2006/0221779 | A1 | 10/2006 | Matsushita et al. |
| 2006/0265718 | A1 | 11/2006 | Tsang |
| 2007/0002047 | A1 | 1/2007 | Desgranges et al. |
| 2007/0011702 | A1 | 1/2007 | Vaysman |
| 2007/0061745 | A1 | 3/2007 | Anthony et al. |
| 2007/0081813 | A1 | 4/2007 | Hong et al. |
| 2007/0104390 | A1 | 5/2007 | Foote |
| 2007/0136286 | A1 | 6/2007 | Webster et al. |
| 2007/0209025 | A1 * | 9/2007 | Jing et al. ............... 715/968 |
| 2008/0052945 | A1 * | 3/2008 | Matas et al. ............... 34/173 |
| 2008/0089590 | A1 | 4/2008 | Isomura et al. |
| 2008/0133526 | A1 | 6/2008 | Haitani et al. |
| 2008/0225057 | A1 | 9/2008 | Hertzfeld et al. |
| 2008/0307335 | A1 | 12/2008 | Chaudhri et al. |
| 2008/0307359 | A1 | 12/2008 | Louch et al. |
| 2009/0070710 | A1 * | 3/2009 | Kagaya et al. ............... 715/810 |
| 2009/0070711 | A1 * | 3/2009 | Kwak et al. ............... 715/829 |
| 2009/0102805 | A1 | 4/2009 | Meijer et al. |
| 2009/0111511 | A1 * | 4/2009 | Bengtsson ............... 455/556.1 |
| 2009/0128581 | A1 | 5/2009 | Brid et al. |
| 2009/0164512 | A1 | 6/2009 | Aizenbud-Reshef et al. |
| 2009/0187858 | A1 | 7/2009 | Ubillos et al. |
| 2009/0204920 | A1 * | 8/2009 | Beverley et al. ............... 715/768 |
| 2009/0204929 | A1 | 8/2009 | Baurmann et al. |
| 2009/0228827 | A1 | 9/2009 | Robertson et al. |
| 2009/0262091 | A1 | 10/2009 | Ikeda et al. |
| 2009/0262135 | A1 | 10/2009 | Huston et al. |
| 2010/0005119 | A1 | 1/2010 | Howard et al. |
| 2010/0079480 | A1 | 4/2010 | Murtagh |
| 2010/0083165 | A1 * | 4/2010 | Andrews et al. ............... 715/784 |
| 2010/0235769 | A1 * | 9/2010 | Young et al. ............... 715/764 |
| 2011/0053641 | A1 * | 3/2011 | Lee et al. ............... 455/556.1 |
| 2011/0055752 | A1 * | 3/2011 | Rubinstein et al. ............ 715/784 |
| 2011/0090255 | A1 * | 4/2011 | Wilson et al. ............... 345/647 |
| 2011/0093812 | A1 * | 4/2011 | Fong ............... 715/810 |
| 2013/0125002 | A1 * | 5/2013 | Spaeth et al. ............... 715/731 |

FOREIGN PATENT DOCUMENTS

| | | |
|---|---|---|
| JP | 2006-521594 A | 9/2006 |
| JP | 2007-322847 A | 12/2007 |
| WO | WO 2005/069170 A1 | 7/2005 |
| WO | WO 2007/067858 A2 | 6/2007 |
| WO | WO 2007121557 | 11/2007 |

OTHER PUBLICATIONS

Kaaresoja, T. et al., "Snap-Crackle-Pop: Tactile Feedback for Mobile Touch Screens," Nokia Research Center, Eurohaptics 2006, Paris France, three pages.

PCT International Search Report and Written Opinion, PCT Application No. PCT/US2010/057220, Jan. 11, 2011, eleven pages.

PCT International Search Report and Written Opinion, PCT Application No. PCT/US2010/057226, Jan. 18, 2011, ten pages.

PCT International Search Report and Written Opinion, PCT Application No. PCT/US2010/057183, Apr. 19, 2012, twelve pages.

Danish Patent and Trademark Office, Singapore Search Report, Application No. 201203814-7, Jan. 23, 2014, nineteen pages.

European Patent Office, Examination Report, European Patent Application No. 10833788.2, Feb. 6, 2014, five pages.

Japanese Patent Office, Office Action, Japanese Patent Application No. 2012-541115, Dec. 24, 2013, twelve pages.

Atomix Technologies Limited, "JetPhoto software—organizing and geotagging photos, creating flash galleries, publishing web albums," 2004-2013, two pages. [Online] [Retrieved Jan. 31, 2014] Retrieved from the Internet <URL: http://www.jetphotosoft.com/web/?s=feature_organizing>.

Blizzard, C., "New Device API for Firefox 3.6: Orientation," Oct. 12, 2009, four pages. [Online] [Retrieved Jan. 31, 2014] Retrieved from the Internet <URL:https://hacks.mozilla.org/2009/10/orientation-for-firefox/>.

Bruneau, P. et al., "Geo-temporal Structuring of a Personal Image Database with Two-Level Variational-Bayes Mixture Estimation," *6th International Workshop on Adaptive Multimedia Retrieval (AMR '08)*, 2008, pp. 127-139, Berlin, Germany.

Crandall, D. et al., "Mapping the World's Photos," *Proceedings of the 18th International Conference on World Wide Web (WWW '09)*, Apr. 20-24, 2009, pp. 761-770, Madrid, Spain.

Flickr, "Help / FAQ / The Organizr," Date Unknown, three pages. [Online] [Retrieved Jan. 31, 2014] Retrieved from the Internet <URL: http://www.flickr.com/help/organizr/>.

Girgensohn, A. et al., "MediaGLOW: Organizing Photos in a Graph-based Workspace," *International Conference on Intelligent User Interfaces (IUI '09)*, Feb. 8-11, 2009, pp. 419-423, Sanibel Island, Florida, USA.

Google Inc., "Make a photo collage—Picasa and Picasa Web Albums Help," 2014, three pages. [Online] [Retrieved Feb. 5, 2014] Retrieved from the Internet <URL:https://supportgoogle.com/picasa/answer/19539?hl=en>.

Graham, A. et al., "Time as Essence for Photo Browsing Through Personal Digital Libraries," *Joint Conference on Digital Libraries (JCDL '02)*, Jul. 13-17, 2002, pp. 326-335, Portland, Oregon, USA.

Harada, S. et al., "Lost in Memories: Interacting with Photo Collections on PDAs," *Joint Conference on Digital Libraries (JCDL '04)*, Jun. 7-11, 2004, pp. 325-333, Tucson, Arizona, USA.

Hinckley, K., et al., "Sensing Techniques for Mobile Interaction," *13th Annual ACM Symposium on User Interface Software and Technology (UIST '00), CHI Letters* 2(2), Nov. 5-8, 2000, pp. 91-100, San Diego, California, USA.

(56) References Cited

OTHER PUBLICATIONS

Jaffe, A. et al., "Generating Summaries for Large Collections of Geo-Referenced Photographs," *Proceedings of the International Conference on World Wide Web (WWW 2006)*, May 23-26, 2006, pp. 853-854, Edinburgh, Scotland.

Lacerda, Y., et al., "PhotoGeo: a self-organizing system for personal photo collections," *Tenth IEEE International Symposium on Multimedia (ISM 2008)*, Dec. 15-17, 2008, pp. 258-265, Berkeley, California, USA.

Lee, H. et al., "Constructing a SenseCam visual diary as a media process," *Multimedia Systems*, Dec. 2008, pp. 341-349, vol. 14, Issue 6.

Munir, A. et al., "Memento: Click, Browse, Share, Clustering, Framework," Date unknown, two pages. [Online] [Retrieved Feb. 5, 2014] Retrieved from the Internet <URL:http://people.csail.mit.edu/hal/mobile-apps-fall-08/pdfs/memento.pdf.>.

Munir, A. et al., "Projects/Memento 2.0—6.831 Wiki", May 13, 2009, thirty-five pages. [Online] [Retrieved Jan. 31, 2014] Retrieved from the Internet <URL: http://courses.csail.mit.edu/6.831/wiki/index.php?title=Projects/Memento_2.0>.

Naaman, M. et al., "Adventures in Space and Time: Browsing Personal Collections of Geo-Referenced Digital Photographs," Technical Report, 2004, Stanford University, California, USA, ten pages.

Naaman, M. et al., "Assigning textual names to sets of geographic coordinates," *Computers, Environment and Urban Systems*, 2006, pp. 418-435, vol. 30, No. 4.

Naaman, M. et al., "Automatic Organization for Digital Photographs with Geographic Coordinates," *Joint Conference on Digital Libraries (JCDL '04)*, Jun. 7-11, 2004, pp. 53-62, Tucson, Arizona, USA.

Naaman, M. et al., "Context Data in Geo-Referenced Digital Photo Collections," *ACM Multimedia 2004 (MM '04)*, Oct. 10-16, 2004, pp. 196-203, New York, New York, USA.

Naaman, M., "Leveraging Geo-Referenced Digital Photographs," A Dissertation Submitted to the Dept. of Computer Science and the Committee on Graduate Studies of Stanford University in Partial Fulfillment of the Requirements for the Degree of Doctor of Philosophy, Jul. 2005, two hundred nineteen pages.

Pigeau, A. et al., "Building and Tracking Hierarchical Geographical & Temporal Partitions for Image Collection Management on Mobile Devices," *Proceedings of the 13th Annual ACM International Conference on Multimedia (MM '05)*, Nov. 6-12, 2005, pp. 141-150, Singapore.

Pigeau, A. et al., "Organizing a personal image collection with statistical model-based ICL clustering on spatio-temporal camera phone meta-data," *Journal of Visual Communication and Image Representation*, 2004, pp. 425-445, vol. 15, Issue 3.

Platt, J. et al., "PhotoTOC: Automatic Clustering for Browsing Personal Photographs," Feb. 2002, Technical Report MSR-TR-2002-17, twenty-one pages.

Platt, J. et al., "PhotoTOC: Automatic Clustering for Browsing Personal Photographs," *Fourth International Conference on Information, Communications & Signal Processing, Fourth IEEE Pacific-Rim Conference on Multimedia (ICICS-PCM 2003)*, Dec. 15-18, 2003, pp. 6-10, Singapore.

Poupyrev, I. et al., "Ambient Touch: Designing Tactile Interfaces for Handheld Devices," *Proceedings of the 15th Annual ACM Symposium on User Interface Software and Technology (UIST'02)*, Oct. 27-30, 2002, pp. 51-60, Paris, France.

Ravichandran, D., "Clustering Photos to Improve Visualization of Collections," Master Thesis in Media Informatics, Mar. 2007, Rheinisch-Westfalischen Technischen Hochschule, Aachen, Germany, ninety pages.

Savov, V., "Firefox 3.6 will support accelerometers, make the internet seasick (video)," Oct. 14, 2009, four pages. [Online] [Retrieved Jan. 31, 2014] Retrieved from the Internet <URL: http://www.engadget.com/2009/10/14/firefox-3-6-will-support-accelerometers-make-the-internet-seasi/>.

Shankland, S., "Next Firefox can detect computer orientation," Oct. 12, 2009, *Deep Tech—CNET News*, three pages. [Online] [Retrieved Jan. 31, 2014] Retrieved from the Internet <URL: http://news.cnet.com/8301-30685_3-10373677-264.html>.

Suh, B., "Image Management using Pattern Recognition Systems," 2005, Ph.D. Dissertation from the Department of Computer Science, HCIL-2006-21, University of Maryland Institute for Advanced Computer Studies, one hundred ninety-one pages.

\* cited by examiner

GALLERY APPLICATION FOR CONTENT VIEWING

CROSS-REFERENCE TO RELATED APPLICATION

This application claims the benefit of U.S. Provisional Application No. 61/283,092, filed Nov. 25, 2009, which is hereby incorporated by reference herein in its entirety.

BACKGROUND

1. Field

The present invention relates generally to graphical user interfaces and more specifically to browsing, viewing, and/or interacting with content items.

2. Description of the Related Art

An image browser is a software application that enables a user to browse multiple images. A conventional image browser displays images arranged in rows and columns, sometimes referred to as a grid, table, or list. If the source images are large relative to the available screen space, it is difficult to display several of the source images simultaneously. In this situation, a conventional image browser displays "thumbnail" versions of the source images rather than the source images themselves. A thumbnail version of a source image is smaller and/or of a lower resolution than the source image.

Sometimes, the image grid is larger than the window that is used to display the grid. The window acts like a "viewport" on top of the image grid that allows certain parts of the grid (those parts that are underneath the viewport) to be displayed. In this situation, more images exist than are currently displayed. In order to view these images, the image grid is kept stationary, and the user moves the viewport relative to the image grid, thereby allowing different parts of the grid (those parts that are underneath the viewport based on the viewport's new position) to be displayed. Alternatively, the viewport is kept stationary, and the user moves the image grid relative to the viewport, thereby allowing different parts of the grid (those parts that have moved to be underneath the viewport) to be displayed. This navigation functionality is commonly referred to as scrolling.

SUMMARY

A gallery software application enables a user to browse, view, and interact with various content items. A content item is an electronic file of any sort. In one embodiment, the gallery application has four main modes: album mode, grid mode, cluster mode, and full-screen mode. A fifth mode (executable mode) is available for some content items. A user can navigate from one mode to the other.

In album mode, grid mode, cluster mode, and full-screen mode, a content item is represented by an image. In album mode, grid mode, and cluster mode, the image is small (relative to the screen size), so it is referred to as a "thumbnail" image. In full-screen mode, the image is about the size of the screen. Executable mode is available if a content item can be executed in some way. In executable mode, an appropriate player is launched that plays the content item full-screen.

Album mode, grid mode, and cluster mode can each display multiple objects. In album mode, the objects are album stacks. In grid mode, the objects are thumbnail images. In cluster mode, the objects are cluster stacks. In each of these modes, the objects can be scrolled through. When the user attempts to scroll before the first item or after the last item, feedback is provided to indicate that an edge has been reached. In one embodiment, when the device is tilted, the camera angle onto the displayed objects rotates around to show slightly different angles onto the album stacks, cluster stacks, or grid thumbnails. This is similar to the tilted view that occurs when the user tries to scroll past an edge.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Figure 1:
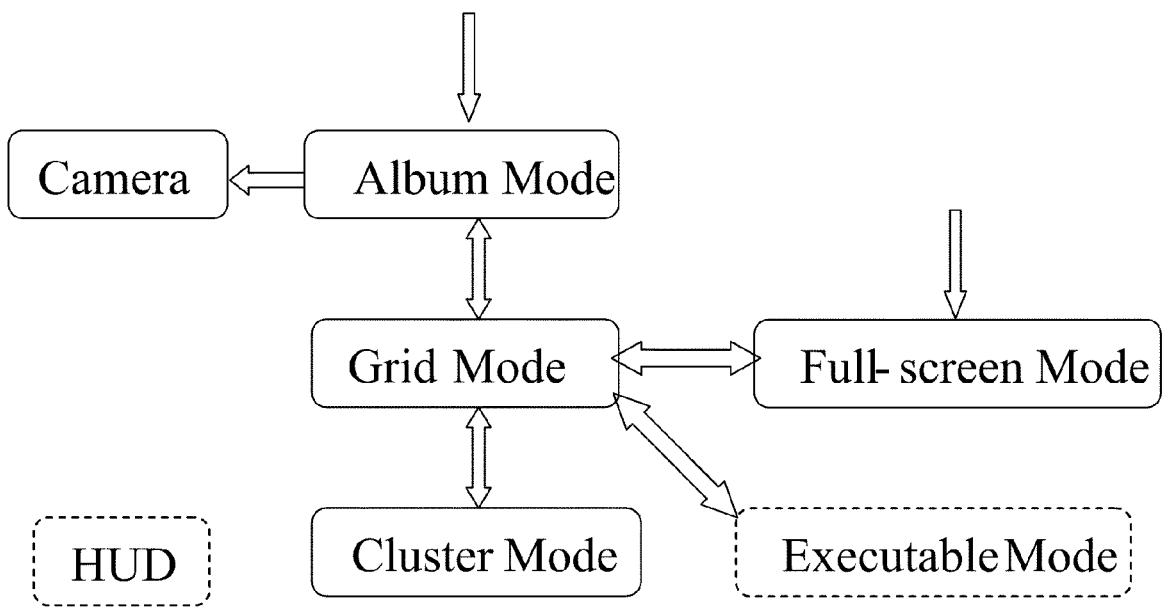
FIG. 1 shows a block diagram of various modes of a gallery application and the user interface flow between them, according to one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

1. Overview

A gallery software application enables a user to browse, view, and interact with various content items. A content item is an electronic file of any type (e.g., still image, video, document, web page, or executable).

The gallery application can be executed on any processor-based device. In one embodiment, the gallery application executes on a handheld device that includes a touchscreen, a camera, and an accelerometer. The handheld device could also include additional devices and functionalities, such as a GPS chip, a pointing device (e.g., a trackball, joystick, or 5-way button), and a "Back" button.

The content items can be stored locally (i.e., on the device) or remotely (e.g., on a networked server). A content item could be stored remotely using, for example, the Google Picasa service or the Yahoo! Flickr service. Note that where a content item is stored and/or where a content item comes from has no effect on how the item appears and behaves in the gallery application. In one embodiment, the gallery application maintains a mapping from its own content descriptors and actions to content descriptors and actions defined by third-party systems.

In one embodiment, the gallery application has four main modes: album mode, grid mode, cluster mode, and full-screen mode. A fifth mode (executable mode) is available for some content items. In album mode, grid mode, cluster mode, and full-screen mode, a content item is represented by an image. The word "image" is meant to include any type of visual content. An image can be, for example, a photograph, a drawing, a frame of video, or text (e.g., a web page or other document or portion thereof). In album mode, grid mode, and cluster mode, the image is small (relative to the screen size), so it is referred to as a "thumbnail" image. In full-screen mode, the image is about the size of the screen. Album mode, grid mode, cluster mode, and full-screen mode can be used when the device is in either a portrait orientation or a landscape orientation. The device's accelerometer detects the orientation of the device and displays the images accordingly (i.e., with or without rotation).

Executable mode is available if a content item can be executed in some way. Executable content items include, for example, videos, web pages, and Adobe FLASH applications. In executable mode, an appropriate player is launched that plays the content item full-screen. For example, a video player (such as RealPlayer from RealNetworks or QuickTime from Apple) is launched to play a video content item (such as an .mp3 file). A web browser (such as Firefox from Mozilla or Chrome from Google) is launched to display a web page (so that the hyperlinks are operative). Executable mode is not available for a still image.

A user can navigate from one mode to the other. FIG. 1 illustrates the user interface flow between modes. In FIG. 1, an arrow that points from a first mode to a second mode signifies that a user can directly navigate from the first mode to the second mode using the touchscreen. For example, the user can directly navigate from album mode to grid mode using the touchscreen. The user can also directly navigate from grid mode to album mode using the touchscreen. Navigation between modes can also be performed using a "Back" button or tapping an icon in a path bar (described below).

Two modes (album mode and full-screen mode) have arrows pointing to them from empty space. These arrows indicate that the gallery application can be launched into album mode or into full-screen mode. If the gallery is activated without specifying a particular content item, then the gallery launches into album mode. If the gallery is activated with a particular content item specified, then the gallery launches into full-screen mode with that particular content item displayed.

In FIG. 1, "HUD" refers to a heads-up display (HUD) that is part of the gallery application. The HUD is available from album mode, grid mode, cluster mode, and full-screen mode and will be further described below. "Camera" refers to a camera application that is present on the device and is not part of the gallery application.

Album mode, grid mode, and cluster mode can each display multiple objects. In album mode, the objects are album stacks. In grid mode, the objects are thumbnail images. In cluster mode, the objects are cluster stacks. In each of these modes, the objects can be scrolled through. Scrolling is performed using a gesture (e.g., a horizontal finger swipe or flick) and the touchscreen or using a pointing device. The gesture can be located over the objects or over the background behind/around the objects. A quick gesture will scroll past more columns than a slow gesture. The number of columns scrolled past will depend on the speed of the gesture and the length of time the finger is held down when performing the gesture.

When the user attempts to scroll before the first item or after the last item, feedback is provided to indicate that an edge has been reached. One type of feedback is tilting the view away from the plane of the screen at an angle proportional to the overflow width (i.e., the requested scrolling that cannot be performed because the edge has been reached). The tilting makes the view appear like it has perspective distortion. The tilting is brief, after which the view returns to its normal orientation parallel to the plane of the screen. Another type of feedback is a "rubber band" effect where the list of items appears to hit the side of the display and bounce back in the opposite direction. Yet another type of feedback is tactile (e.g., a slight vibration in the device).

In one embodiment, when the device is tilted, the camera angle onto the displayed objects rotates around to show slightly different angles onto the album stacks, cluster stacks, or grid thumbnails. This is similar to the tilted view that occurs when the user tries to scroll past an edge.

Path Bar—In the upper-left corner in album mode, grid mode, and cluster mode (and the full-screen mode HUD) is a path bar that indicates a folder hierarchy that tells the user where the displayed images are stored with respect to various folders, etc. Each node of the hierarchy is shown by an icon (and also by text, if there is room). The root of the hierarchy is on the left and represents the gallery application. The next level of the hierarchy, which is shown to the right of the root, is the album. The next level of the hierarchy, which is shown to the right of the album, is the content item. The folder hierarchy is not longer than one line. As much text is shown as possible, starting from the current location (i.e., farthest right element) and moving to the next higher element if there is room. When content is being loaded, the icon of the rightmost element changes to a spinner to indicate the loading. In one embodiment, during loading, the path bar indicates the loading progress (e.g., "75 of 100 items loaded").

The following sections describe the four main modes (album, grid, cluster, and full-screen), transitions between modes, and additional features.

2. Album Mode

An album is a set of one or more content items. The content items are ordered in some way (e.g., chronologically based on timestamps). In album mode, a content item is represented as a thumbnail image. An album thumbnail has an inner shadow, a 2-pixel white rectangular frame, and an outer shadow. An album is represented by a stack of thumbnail images. The stack includes thumbnail images for the first few content items in that album. In this way, a stack represents the contents of an album.

The thumbnail images are stacked so that the image for the first content item in the album is on top of the stack, the image for the second content item in the album is second from the top of the stack, and so on. The stack appearance consists of one picture that is the foreground, and the other pictures are randomly placed underneath the first picture with centers within a certain region and randomly oriented to be roughly upright. For example, the first image is not rotated, while the other images are rotated a random amount within a small degree range. The second and subsequent images are also centered a random amount away from the first image's center. The random rotation and random centering of the second and subsequent images creates a "messy" stack effect.

In one embodiment, the number of thumbnails present in a stack depends on the number of content items in that album (more thumbnails indicates more content items). A stack includes, for example, images for the first four content items in the album.

Album mode displays a scrollable list of albums (i.e., a scrollable list of stacks). The list can be displayed in portrait orientation or in landscape orientation, depending on the orientation of the device. In portrait orientation, the albums are arranged in three rows and can be scrolled horizontally left and right. The display accommodates two albums in each row, for a maximum of six albums displayed. In landscape orientation, the albums are arranged in two rows and can be scrolled horizontally left and right. The display accommodates three albums in each row, for a maximum of six albums displayed.

Figure 2:
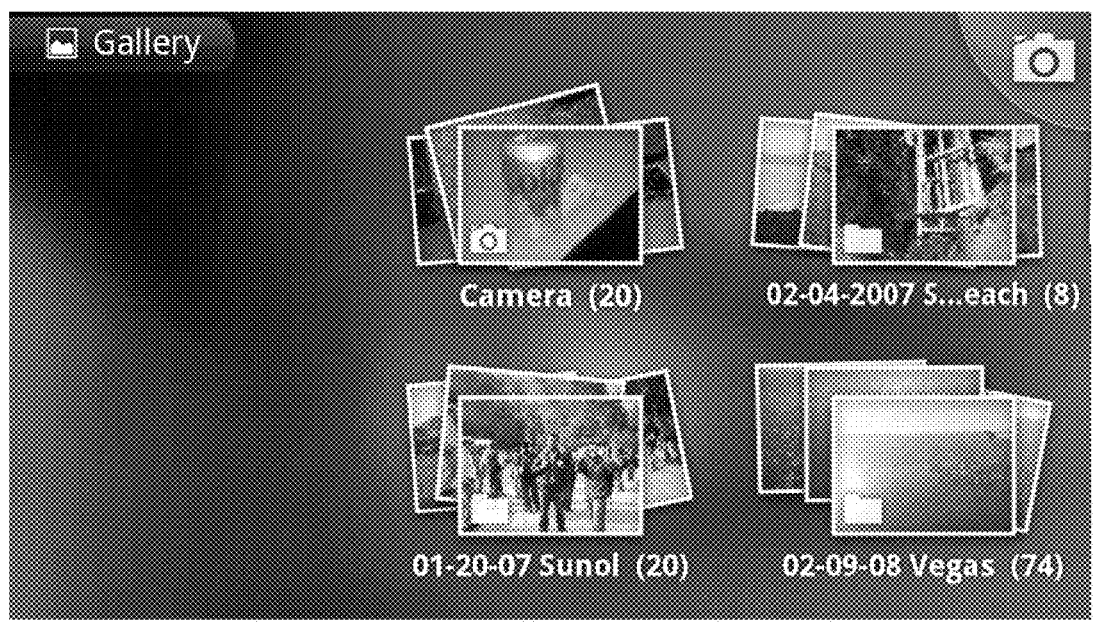
FIG. 2 shows a screenshot of an initial view in album mode (landscape orientation), according to one embodiment of the invention.

FIG. 2 shows a screenshot of an initial view in album mode (landscape orientation). In FIG. 2, four albums (stacks) are displayed. After this initial view, whenever the album stack list is scrolled and then stops moving, the stack placement is automatically adjusted so that one column is in the center of the display.

Each album stack is labeled with the title of the album (e.g., "Camera" or "01-20-07 Sunol") and the number of content items in the album (e.g., 20 or 8). A stack can also include an icon that conveys information about the album. For example, the camera icon signifies that the album contains content items that were captured using the device's camera. The folder icon signifies that the album is stored locally. A "play" icon (not shown) signifies that the top-most content item in the stack is a video. Other icons can convey different information, such as the source of a remote album (e.g., Picasa or Flickr).

FIG. 2 also shows a camera icon in the upper-right corner of the screen. This camera icon is a virtual button (or soft key) that, when activated, launches the device's camera application.

In one embodiment, some default albums are present. If the device includes a camera, then one album (entitled "Camera") is the default location for pictures or videos taken using the device's camera. If the device includes a web browser, then one album (entitled "Downloads") is the default location for content items downloaded from the web. In one embodiment, in album mode, the Camera album is listed first, followed by local albums and the Downloads album, followed by albums that are stored remotely. Among multiple albums of the same type (e.g., local albums or remote albums), albums are listed based on their most recent capture dates, from newest to oldest.

Figure 3:
FIG. 3 shows a screenshot of an album mode heads-up display (HUD) with one album (Munich, Germany) selected (landscape orientation), according to one embodiment of the invention.

HUD—A user can select one or more albums and manipulate them. Touching one album for longer than one second selects that album. That action also launches a heads-up display (HUD) that enables a user to select additional albums and manipulate the selected albums. FIG. 3 shows a screenshot of the album mode HUD with one album (Munich, Germany) selected (landscape orientation). When the HUD is shown, each album stack includes a checkbox icon. If the checkbox icon is grayed out, then that album is not selected. If the checkbox icon is green, then that album is selected.

The HUD is divided into six regions: top-left, top-center, top-right, bottom-left, bottom-center, and bottom-right. The top-left region (labeled "Select All") enables a user to select all albums with a single tap. The top-center region indicates the number of content items that are currently selected. (Here, the album entitled "Munich, Germany" is selected and contains 141 items, so the top-center region is labeled "141 items.") The top-right region (labeled "Deselect All") enables a user to deselect all albums with a single tap.

Figure 4:
FIG. 4 shows a screenshot of an album mode HUD after a Share region has been activated (landscape orientation), according to one embodiment of the invention.

The bottom-left region (labeled "Share") enables a user to share selected items. FIG. 4 shows a screenshot of the album mode HUD after the Share region has been activated (landscape orientation). The Share options enable the user to share content items with other people. Options include, for example, sharing services (such as Picasa), data transfer protocols (such as Bluetooth), messaging protocols (such as XMPP), and email applications (such as Gmail).

The bottom-center region (labeled "Delete") enables a user to delete selected items.

Figure 5:
FIG. 5 shows a screenshot of an additional feature "Details" being displayed (landscape orientation), according to one embodiment of the invention.
Figure 6:
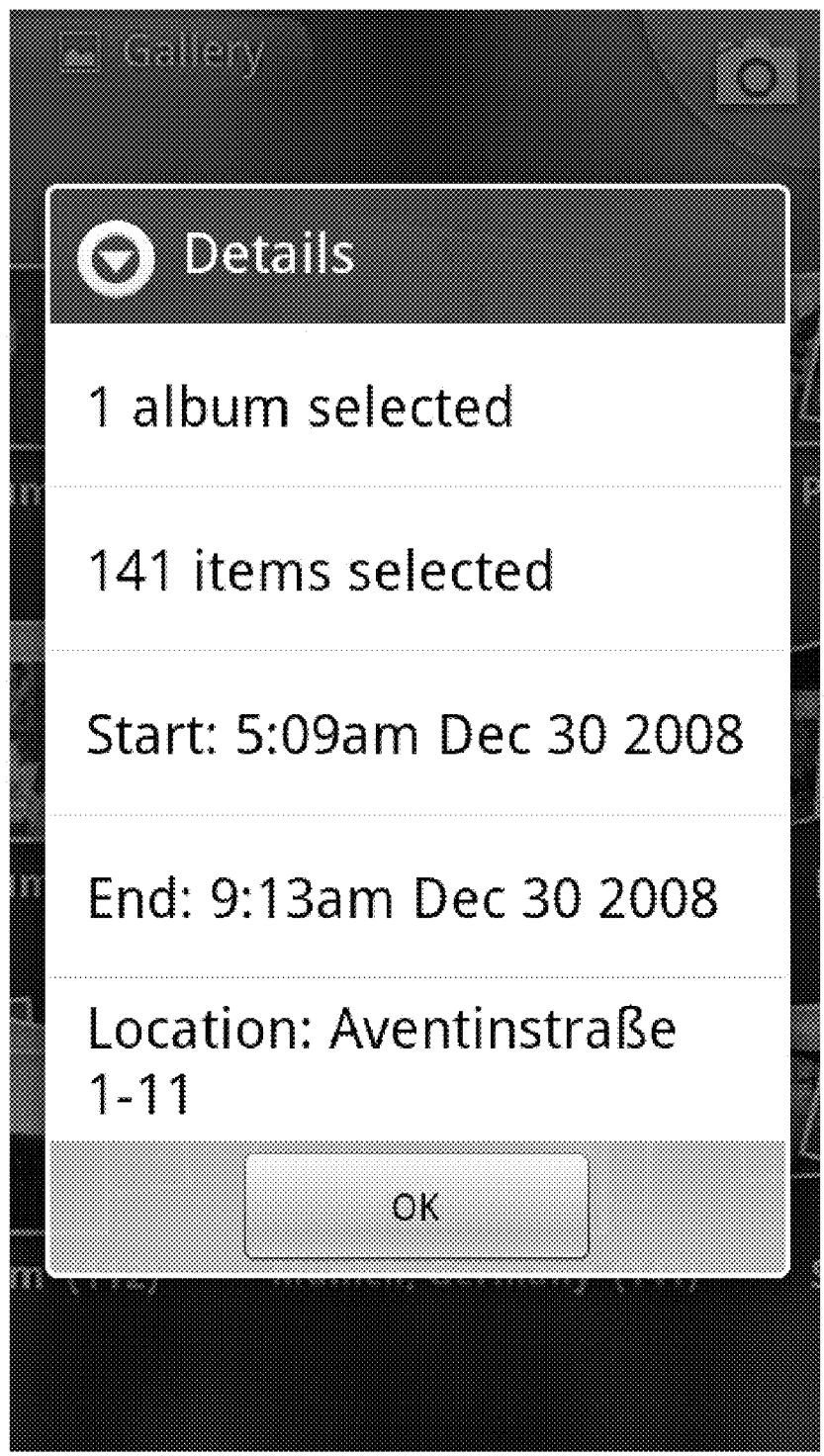
FIG. 6 shows a screenshot of an album mode details (portrait orientation), according to one embodiment of the invention.

The bottom-right region (labeled "More") gives the user access to additional features. When the More region is activated, one or more additional features are displayed. FIG. 5 shows a screenshot of the additional feature "Details" being displayed (landscape orientation). Activating the Details region causes the album mode details to be displayed. FIG. 6 shows a screenshot of the album mode details (portrait orientation).

These details include the number of albums selected (1), the number of items selected (141), the timestamp of the earliest selected item (5:09 am Dec. 30, 2008), the timestamp of the latest selected item (9:13 am Dec. 30, 2008), and the location of the items (e.g., the geographical location that is shown in an image content item; here, Aventinstraβe 1-11).

3. Grid Mode

Grid mode displays content items of one album in a scrollable grid pattern. Each content item is represented by a thumbnail image. In one embodiment, a grid thumbnail has a more subtle border style than an album thumbnail. For example, a grid thumbnail has an inner shadow, a 1-pixel translucent white inset border, and an outer shadow.

The grid can be displayed in portrait orientation or in landscape orientation. In portrait orientation, the images are arranged in four rows and can be scrolled horizontally left and right. The display accommodates three images in each row, for a maximum of twelve images displayed. In landscape orientation, the albums are arranged in three rows and can be scrolled horizontally left and right. The display accommodates four images in each row, for a maximum of twelve images displayed.

Figure 7:
FIG. 7 shows a screenshot of an initial view in grid mode (portrait orientation), according to one embodiment of the invention.

FIG. 7 shows a screenshot of an initial view in grid mode (portrait orientation). FIG. 7 shows four rows of thumbnail images arranged in a grid pattern. Two columns of images are shown fully, and a third column of images is shown partially. After this initial view, whenever the grid is scrolled and then stops moving, the grid placement is automatically adjusted so that no columns are clipped on either side. This automatic adjustment occurs in both portrait orientation and landscape orientation.

Grid mode shows images from an album. Thus, in FIG. 7, the path bar shows only the root of the hierarchy and the album level. The content item level is shown in full-screen mode, which will be discussed below. In FIG. 7, the root of the hierarchy is shown by an icon that represents the gallery application. The album level is shown by an icon that represents the album (here, a Picasa icon) and the beginning of the title of the album (here, "Many ph . . . ").

In the upper-right corner is a user interface control that is used to transition between grid mode and cluster mode. This control will be described in a later section.

If an image in the grid represents an executable content item, then the user can switch to executable mode to "play" that item. For example, if the content item is a video, then the user can switch to executable mode (e.g., by tapping the image) to play the video full-screen. In one embodiment, the image includes an icon that indicates the type of executable item (e.g., a "play" icon for a video).

Figure 8:
FIG. 8 shows a screenshot of grid mode where the middle image in the bottom row has been pressed (portrait orientation), according to one embodiment of the invention.

If a thumbnail image in the grid is pressed, then the image appears to move upwards towards the user. FIG. 8 shows a screenshot of grid mode where the middle image in the bottom row has been pressed (portrait orientation).

Scroll bar—In addition to the scrolling methods described above, grid mode also includes a scroll bar that can be used for scrolling. In FIG. 8, the scroll bar is located below the grid. The scroll bar can be dragged horizontally using the touch-screen. As the scroll bar is being dragged, the grid moves in the opposite direction as the dragging. For example, if the scroll bar is dragged to the right, then the grid scrolls to the left, thereby showing new images on the right side of the screen. The speed of the scrolling is proportional to the speed of the dragging. After the scroll bar is released, the scroll bar re-centers itself in the middle of the screen. The scroll bar is lit up when it is being dragged.

As mentioned above, an album is a set of ordered content items. In one embodiment, as the scroll bar is being dragged, the "ordering" meta-data for the currently-displayed images is shown. For example, assume that the images are ordered in the album chronologically based on timestamps. When the scroll bar is being dragged, the timestamp for the currently-displayed images is shown. If all images are timestamped Feb. 3, 2007, then "Feb. 3, 2007" will be shown. As scrolling progresses, if the currently-displayed images are timestamped Feb. 4, 2007, then "Feb. 4, 2007" will be shown. Showing the ordering meta-data during scrolling helps the user navigate to the desired portion of the grid. The meta-data can be shown in various places, such as overlaid on the grid.

In another embodiment, multiple values of ordering meta-data are shown. For example, the meta-data for the currently-displayed images is shown along with meta-data for the off-screen images that are adjacent to the currently-displayed images to the left and/or to the right. Showing the ordering meta-data for off-screen images tells the user information about these images that are "ahead" or "behind" the current location in the grid. Clicking on meta-data for off-screen images scrolls the grid to that location. The meta-data can be shown in various places, such as below the grid.

In yet another embodiment, various date markers are shown chronologically. A date marker that is associated with one or more content items appears bright, while a date marker that is not associated with any content items appears dull or grayed out.

Figure 9:
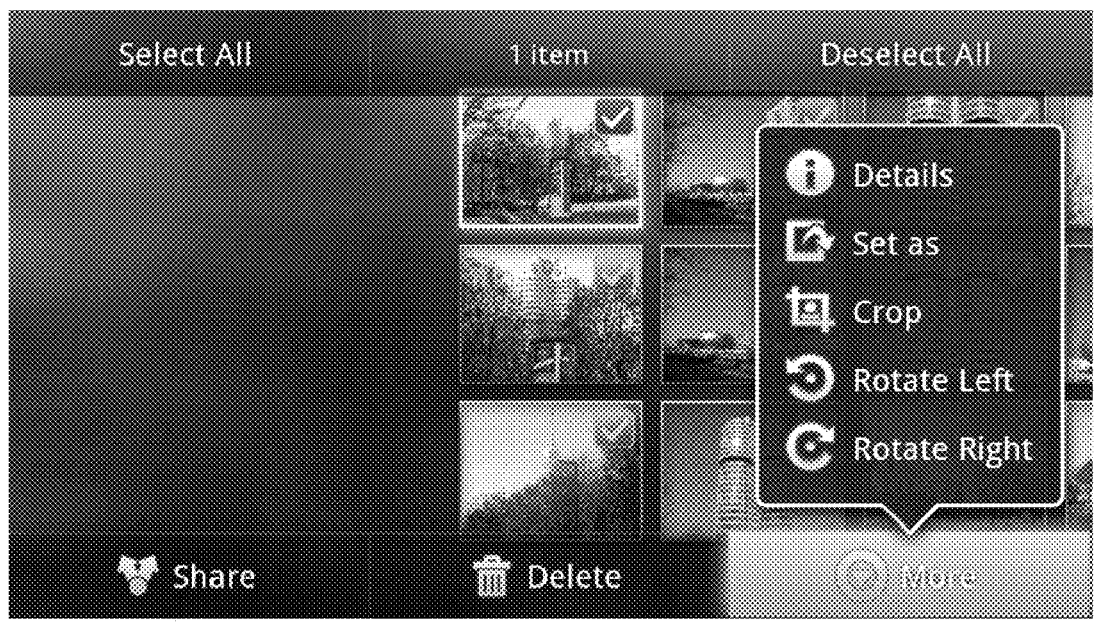
FIG. 9 shows a screenshot of a grid mode HUD with one content item (the image in the upper-left) selected (landscape orientation), according to one embodiment of the invention.

HUD—A user can select one or more content items and manipulate them. Touching one thumbnail image for longer than one second selects the content item represented by that image. That action also launches a heads-up display (HUD) that enables a user to select additional content items and manipulate the content items. FIG. 9 shows a screenshot of the grid mode HUD with one content item (the image in the upper-left) selected (landscape orientation).

When the HUD is shown, each thumbnail image includes a checkbox icon. If the checkbox icon is grayed out, then that image is not selected. If the checkbox icon is green, then that image is selected.

The HUD is divided into six regions: top-left, top-center, top-right, bottom-left, bottom-center, and bottom-right. The top-left region (labeled "Select All") enables a user to select all content items with a single tap. The top-center region indicates the number of content items that are currently selected. (Here, one image is selected, so the top-center region is labeled "1 item.") The top-right region (labeled "Deselect All") enables a user to deselect all images with a single tap.

The bottom-left region (labeled "Share") enables a user to share selected items. The grid mode Share region functions similarly to the album mode Share region, which was described above. The bottom-center region (labeled "Delete") enables a user to delete selected items.

The bottom-right region (labeled "More") gives the user access to additional features. When the More region is activated, one or more additional features are displayed. FIG. 9 shows the additional features "Details", "Set as", "Crop", "Rotate Left", and "Rotate Right" being displayed (landscape orientation).

Activating the Details region causes the grid mode details to be displayed. Activating the Set as region causes a selected image to be used as wallpaper. Activating the Crop region enables the user to crop a selected image. Activating the Rotate Left region rotates a selected image to the left. Activating the Rotate Right region rotates a selected image to the right.

4. Cluster Mode

Cluster mode is similar to grid mode, in that both modes display the content items of one album. Also, each content item is represented by a thumbnail image. However, cluster mode displays the items in stacks, whereas grid mode displays the items in a grid pattern. In this way, cluster mode is similar to album mode, since both modes use a "stack" representation.

Cluster mode automatically groups items based on time and/or location (e.g., based on a timestamp or a geographical tag ("geotag") associated with an item, referred to as "geocoding"). The geotag might be stored in an exchangeable image file format (EXIF) header associated with the content item.

Figure 10:
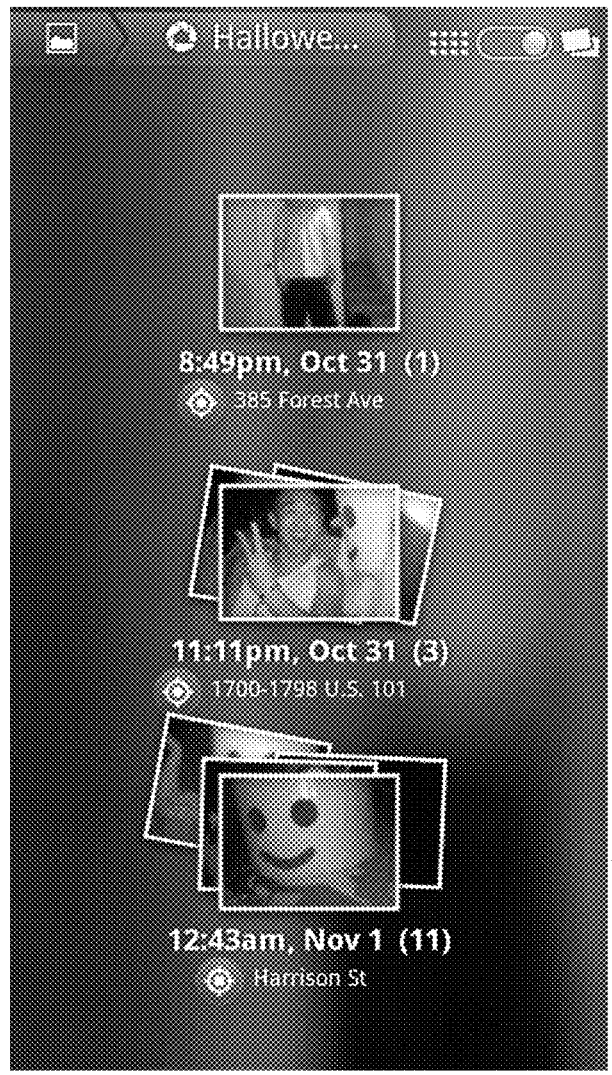
FIG. 10 shows a screenshot of an initial view in cluster mode (portrait orientation), according to one embodiment of the invention.

Each cluster is displayed as a stack of thumbnails chosen from the contained items. FIG. 10 shows a screenshot of an initial view in cluster mode (portrait orientation). In one embodiment, a cluster thumbnail has an inner shadow, a 2-pixel white rectangular frame, and an outer shadow (the same as an album thumbnail).

FIG. 10 shows three rows of cluster stacks arranged in a grid pattern. One column of cluster stacks is shown fully.

Under each cluster stack is a time string, the number of items in the cluster, a geotag icon, and a geotag location.

Regarding the time string, an appropriate text length is selected based on how much space is available. If the cluster content items are older, then maybe only the month range or year range is shown. If the content items are more recent, then maybe the entire date range is shown. For example, if the cluster spans multiple years, then display the time string as "February 2008-March 2009" (only month and year are shown). If the cluster is from a single year but not from the same day in the current year, the time string is "Mar. 3-4, 2009" or "Feb. 3-Mar. 6, 2009" or "Feb. 28, 2008" (display date, month, and year). If the cluster is from a single day and from the current year, pick the midpoint of the cluster and display the time, date, and month, the time string is "2:54 pm, October 16."

The location information appears asynchronously below stacks. The location that is displayed for a cluster is the most specific location that accurately describes all geotagged items in that cluster. The most specific level of location is street name (e.g., "Harrison St"), followed by city name/state (e.g., "Palo Alto, Calif."), "near" city name/state (e.g., "near Palo Alto, California", which is based on a radius distance threshold from the named city), and state/country (e.g., "California, US"). Tapping the geotag icon will launch grid view and filter the album so that only content items with the geotag location are displayed. In one embodiment, geotag functionality uses the Google Maps Reverse-Geocoding service.

In the upper-left corner is the path bar that was described above. Cluster mode shows images from an album. Thus, in FIG. 10, the path bar shows only the root of the hierarchy and the album level. The root of the hierarchy is shown by an icon that represents the gallery application. The album level is shown by an icon that represents the album (here, a Picasa icon) and the beginning of the title of the album (here, "Hallowe . . . ").

In the upper-right corner is a user interface control that is used to transition between grid mode and cluster mode. This control will be described in a later section.

Cluster stacks are similar to album stacks, in that the first image is not rotated, while the other images are rotated a random amount within a small degree range. The second and subsequent images are also centered a random amount away from the first image's center. The random rotation and random centering of the second and subsequent images creates a "messy" stack effect. Cluster stacks with more items may occupy more space than stacks with fewer items.

In one embodiment, the number of thumbnails present in a stack depends on the number of content items in that cluster (more thumbnails indicates more content items). For example, a stack includes three to five thumbnails.

Cluster mode displays a scrollable list of clusters (i.e., a scrollable list of cluster stacks). Cluster stacks are listed in chronological order. The list can be displayed in portrait orientation or in landscape orientation, depending on the orientation of the device.

In one embodiment, the thumbnails selected from each cluster (to form the stack) are representative of the cluster as a whole. For example, the thumbnails are selected based on the following criteria (listed in order from most important to least important, where a more important criterion is weighted more heavily than a less important criterion):

Whether the item is starred/flagged (starred/flagged items are prioritized)

How many times the item has been viewed in full-screen mode (items accessed on more occasions are prioritized)

The item's capture date (more recent items are prioritized)

In one embodiment, a thumbnail from roughly the middle of the cluster is picked for the top of the stack, and a few other random thumbnails are chosen for the rest of the stack.

Figure 11:
FIG. 11 shows a screenshot of a cluster mode HUD with one cluster (Dec. 30, 2008) selected (landscape orientation), according to one embodiment of the invention.

HUD—A user can select one or more clusters and manipulate them. Touching one cluster for longer than one second selects that cluster. That action also launches a heads-up display (HUD) that enables a user to select additional clusters and manipulate the selected clusters. FIG. 11 shows a screenshot of the cluster mode HUD with one cluster (Dec. 30, 2008) selected (landscape orientation).

When the HUD is shown, each cluster includes a checkbox icon. If the checkbox icon is grayed out, then that cluster is not selected. If the checkbox icon is green, then that cluster is selected.

The HUD is divided into six regions: top-left, top-center, top-right, bottom-left, bottom-center, and bottom-right. The top-left region (labeled "Select All") enables a user to select all clusters with a single tap. The top-center region indicates the number of content items that are currently selected. (Here, one cluster is selected, and that cluster contains 18 items, so the top-center region is labeled "18 items.") The top-right region (labeled "Deselect All") enables a user to deselect all clusters with a single tap.

The bottom-left region (labeled "Share") enables a user to share selected clusters. The grid mode Share region functions similarly to the album mode Share region, which was described above. The bottom-center region (labeled "Delete") enables a user to delete selected clusters.

The bottom-right region (labeled "More") gives the user access to additional features. When the More region is activated, one or more additional features are displayed. FIG. 11 shows the additional features "Details", "Rotate Left", and "Rotate Right" being displayed (landscape orientation).

Activating the Details region causes the cluster mode details to be displayed. Activating the Rotate Left region rotates a selected image to the left. Activating the Rotate Right region rotates a selected image to the right.

Clustering Algorithm—Clustering automatically divides a stream of content items into clusters of "events" as best as possible. The clustering algorithm employed is loosely based on agglomerative clustering but does not require pre-specifying the number of clusters to generate. The clustering can be computed in one linear scan over the collection of content items in a streaming fashion—so not all of the content items have to be processed before the first clusters are determined (and then displayed).

A set of clusters that have already been determined is stored. Initially, an empty cluster is created. When the call is made to cluster the next content item, we check if the item is timestamped within X time units of the previous item (adaptive between 1 minute and 2 hours in our case—this is the cluster_split_time). If the next item is within this cluster_split_time of the previous item, then the next item is added to the current existing cluster. On the other hand, if geotag location data is available and the next item is over Y distance units from the previous item (25 miles in our case), then the next item is placed as the start of a new cluster of its own.

Now, if neither of those conditions is met (within time range or exceeding location range), we examine the following—is the current cluster too big and should we split it in two or is the current cluster too small and should we merge it with the cluster before it provided the 2 clusters are not geographically separated by more than 25 miles. If the current cluster is too big (adaptive between 20-50 items in our heuristic), we attempt to split into two by looking for the point in time with the biggest frequency change in photo taking Let A, B, C be 3 consecutive points in time order. Consider (C−B) and (B–A). The ratio between these 2 differences must be at least 2 in order for it to be a frequency split candidate—that is, (C–B) must be greater than twice that of (B–A) or less than half of (B–A)—that qualifies as enough of a frequency difference. In order to not split if the frequency in photo taking goes from 1 sec to 5 sec, we split only if one of (C–B) or (B–A) is over half that of the already computed cluster_split_time. We pick the largest frequency change that satisfies the factor of 2 ratio constraint and the at least half cluster_split_time constraint as the point to split. If no such point exists, we don't split and settle for having made the best effort. We then add the current item to the second cluster if there was a split or to the 1 large cluster if there was no split.

Similarly, in the merging case, we merge the current cluster with the previous cluster if they both have fewer than Z items (adaptive between 8 and 15) and they are not geographically separated by the 25 mile heuristic. We then add the current item to the end of the merged cluster or the current cluster if no merge was possible.

The splitting and merging of clusters results in clusters that are roughly of sizes that people care about (it makes it easy for people to scan quicker and they can easily tell what event a cluster corresponds to). The time constraint, the location constraint and the frequency heuristic try to capture common photo taking behavior.

Adaptive nature of the parameters: We get 2 input points—the time range that the original set spans and the number of items in the set—based on that, we set the cluster_split_time threshold, the min_cluster_size, and the max_cluster_size. Each of these 3 variables has a range and we pick the appropriate number in that range. For example, min_cluster_size ranges from 8 to 15. If the input has only 50 items in it, we may set the min_cluster_size to 8 but if the input has 500 items, we will set the min_cluster_size to 15. Similar logic governs the 3 parameters. It enables the clustering algorithm to adapt better to the set of content items we are dealing with and creates more appropriately-sized clusters.

5. Full-Screen Mode

In full-screen mode, a content item is represented by an image that is about the size of the screen. One image is displayed at a time.

Zoom—Double-tapping the image will zoom in to the image. Double-tapping the zoomed-in image will zoom back out to the original image. A swipe gesture on the image can also be used to zoom in (upward swipe) and zoom out (downward swipe). Zooming in and out can also be accomplished using the HUD (see below).

HUD—When full-screen mode is first entered, the full-screen mode HUD and the path bar are visible for a short amount of time (e.g., one second). After the time has passed, if there has been no user activity, then the HUD and the path bar fade away. After the HUD and the path bar have disappeared, they can be recalled by single-tapping the image.

Figure 12:
FIG. 12 shows a screenshot of a full-screen mode HUD (landscape orientation), according to one embodiment of the invention.

FIG. 12 shows a screenshot of the full-screen mode HUD (landscape orientation). The full-screen HUD includes a zoom-in region and a zoom-out region (upper-right), a Slideshow region (bottom-left), and a Menu region (bottom-right). Activating the zoom-in region zooms in to the displayed image. Activating the zoom-out region zooms out of the displayed image. Activating the Slideshow region starts a full-screen slideshow of images in the current album.

Figure 13:
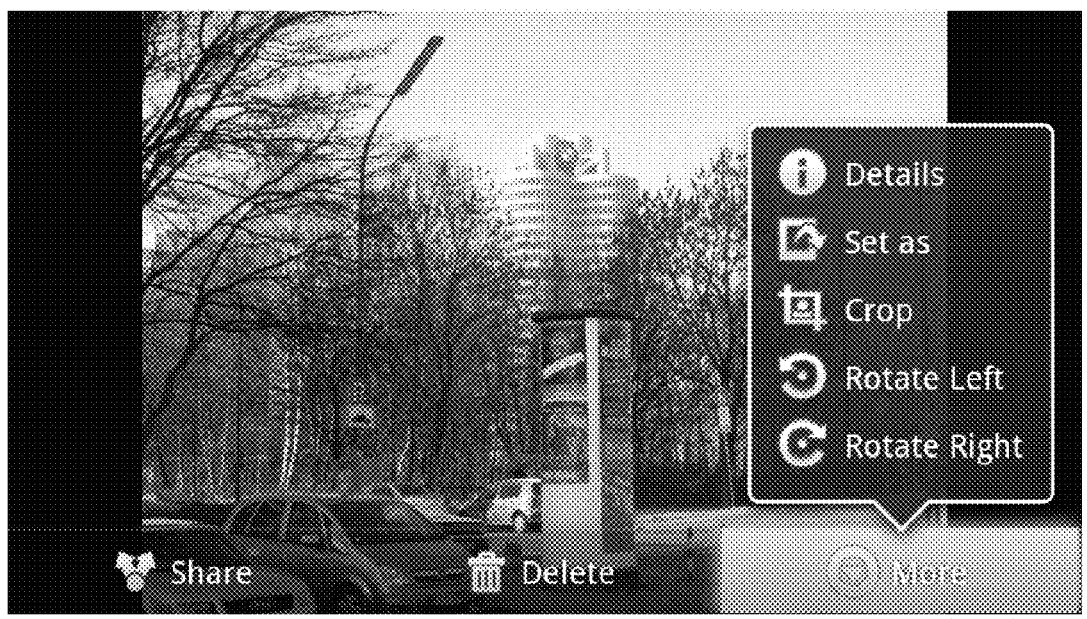
FIG. 13 shows a screenshot of a secondary full-screen mode HUD (landscape orientation), according to one embodiment of the invention.

Activating the Menu region will display a secondary full-screen mode HUD. FIG. 13 shows a screenshot of the secondary full-screen mode HUD (landscape orientation). The secondary HUD operates on the displayed item. The HUD is divided into three regions: bottom-left, bottom-center, and bottom-right. The bottom-left region (labeled "Share") enables a user to share the displayed content item. The full-screen mode Share region functions similarly to the album mode Share region, which was described above. The bottom-center region (labeled "Delete") enables a user to delete selected content item.

The bottom-right region (labeled "More") gives the user access to additional features. When the More region is activated, one or more additional features are displayed. FIG. 13 shows the additional features "Details", "Set as", "Crop", "Rotate Left", and "Rotate Right" being displayed (landscape orientation).

Activating the Details region causes the full-screen mode details to be displayed. The Set as region, Crop region, Rotate Left region, and Rotate Right region function similarly to the grid mode regions, which were described above.

6. Transition Between Album Mode and Grid Mode

When the gallery application is in album mode, a single tap on an album stack transitions the gallery application to grid mode. Grid mode displays the content items of the tapped album (represented by thumbnail images) in a grid pattern.

When going from album mode to grid mode, the representative thumbnails used in the album stack animate to their grid positions. Transitions between modes attempt to reuse as many on-screen thumbnails as possible to provide a direct manipulation feel.

When grid mode is first launched from album mode, the grid is positioned so that the content items at the beginning of the album are shown. FIGS. 14A-D show screenshots of various points in time (in chronological order) during the animation of a transition from album mode to grid mode (portrait orientation).

The animation of the transition from grid mode to album mode is similar to the animation of the transition from album mode to grid mode, except that the movements are reversed chronologically. For example, FIG. 14D (album mode) would be followed by FIG. 14C, then FIG. 14B, and then FIG. 14A.

7. Transition Between Grid Mode and Cluster Mode

Figure 14A:
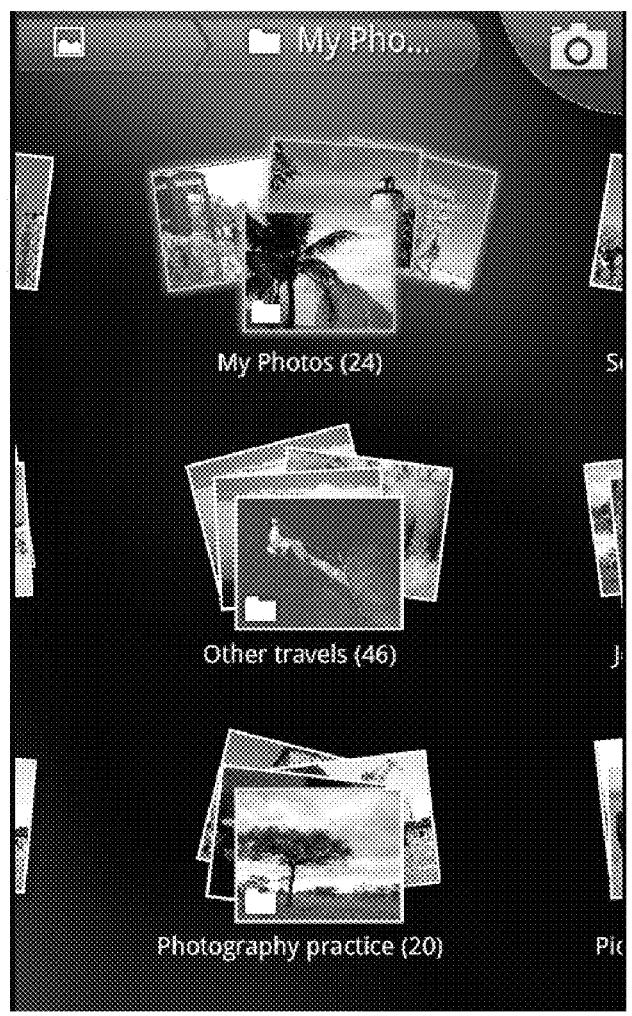
FIGS. 14A-D show screenshots of various points in time (in chronological order) during an animation of a transition from album mode to grid mode (portrait orientation), according to one embodiment of the invention.
Figure 14B:
Figure 14C:
Figure 14D:
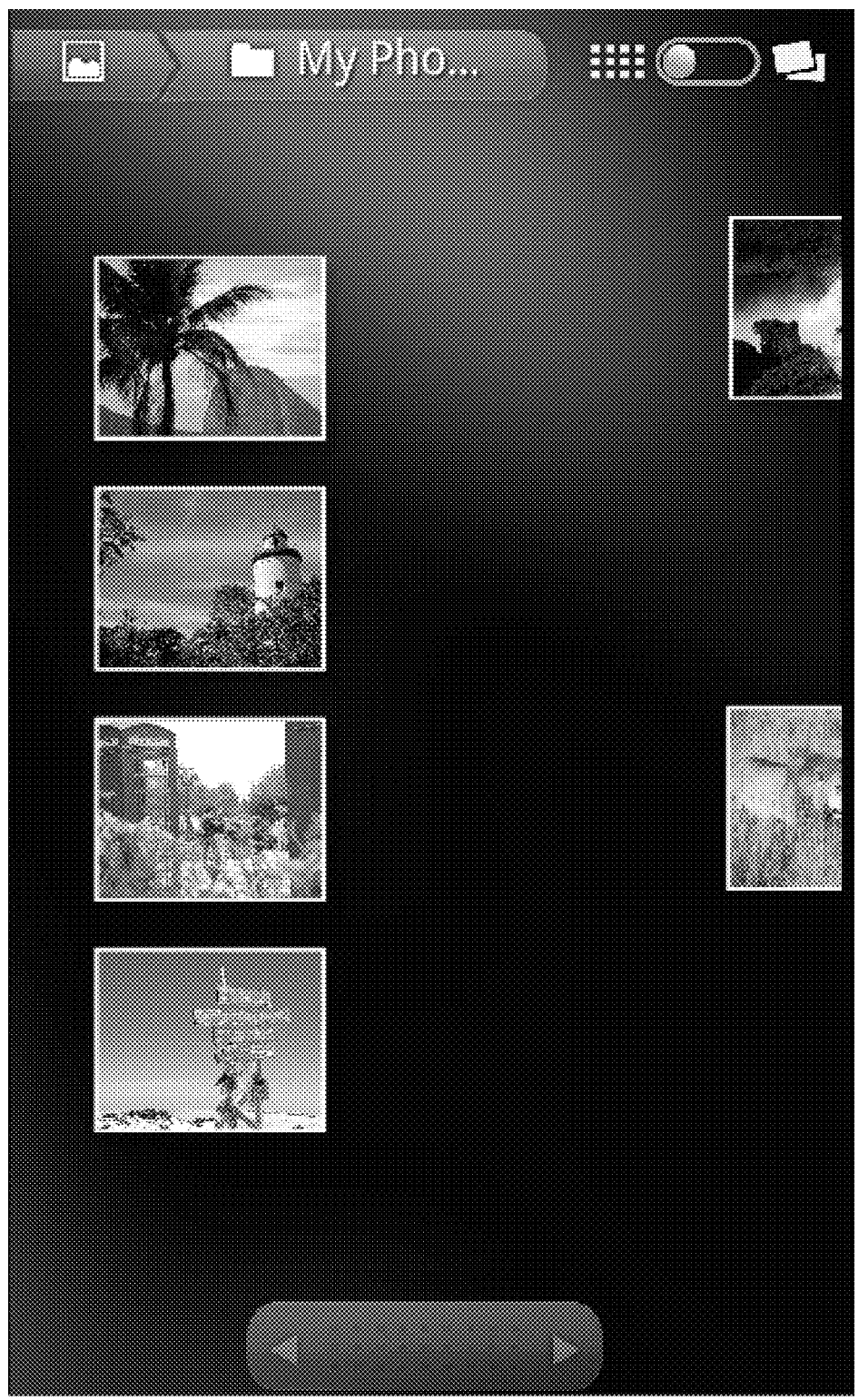

In the upper-right corner of FIG. 14D is a user interface control that is used to transition between grid mode and cluster mode. The control includes a grid mode icon, a slider with a knob, and a cluster mode icon. To switch from grid mode to cluster mode, toggle the slider by dragging the knob to the right. To switch from cluster mode to grid mode, toggle the slider by dragging the knob to the left. Or, to switch to a particular mode, single tap the associated icon (i.e., the grid mode icon or the cluster mode icon).

Alternatively, a swipe gesture on the cluster or grid can be used to switch from cluster mode to grid mode (upward swipe) and from grid mode to cluster mode (downward swipe).

When going from cluster mode to grid mode, the representative thumbnails used in the cluster animate to their grid positions. Transitions between modes attempt to reuse as many on screen thumbnails as possible to provide a direct manipulation feel. In one embodiment, transitions between grid mode and cluster mode cross-fade border styles to ensure continuity.

8. Transition Between Grid Mode and Full-Screen Mode

Once in grid-mode, a single tap on an item takes you to full-screen mode. If the tapped item is executable, then the item will be executed (e.g., a video will be played). If the tapped item is an image, then the image will be displayed full-screen. A single tap in full-screen mode brings back the contextual menus.

9. Additional Features

Figure 15:
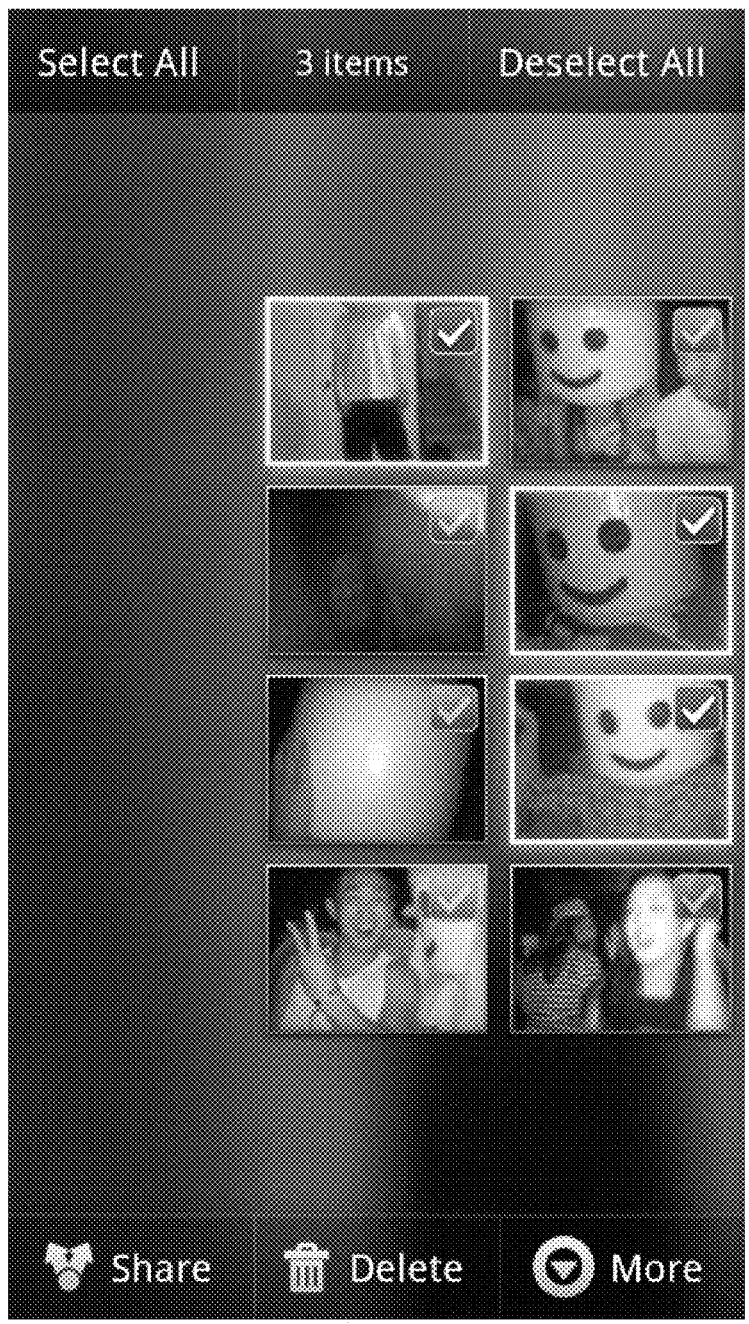
FIG. 15 shows a screenshot of selection of multiple content items (represented by thumbnail images) in grid mode (portrait orientation), according to one embodiment of the invention.
Figure 16:
FIG. 16 shows a screenshot of selection of a single album in album mode (landscape orientation), according to one embodiment of the invention.

Multiple selection—In album mode, grid mode, and cluster mode, pressing an object and holding down for over one second will trigger multi-select mode. In multi-select mode, single-tapping an object will select the object. In this way, the user can select any number of objects. The HUD can then be used to perform an action on all selected objects. FIG. 15 shows a screenshot of selection of multiple content items (represented by thumbnail images) in grid mode (portrait orientation). FIG. 16 shows a screenshot of selection of a single album in album mode (landscape orientation). Note that FIG. 16 is not is not fully indicative of the screen state. Since the screenshot was captured during an animation, the screen is in the process of being re-rendered and is not fully accurate.

Back button—In one embodiment, each tap-initiated navigation pushes onto the back of the gallery application's runtime stack, so that there is no risk of rewinding past expectations.

Figure 17:
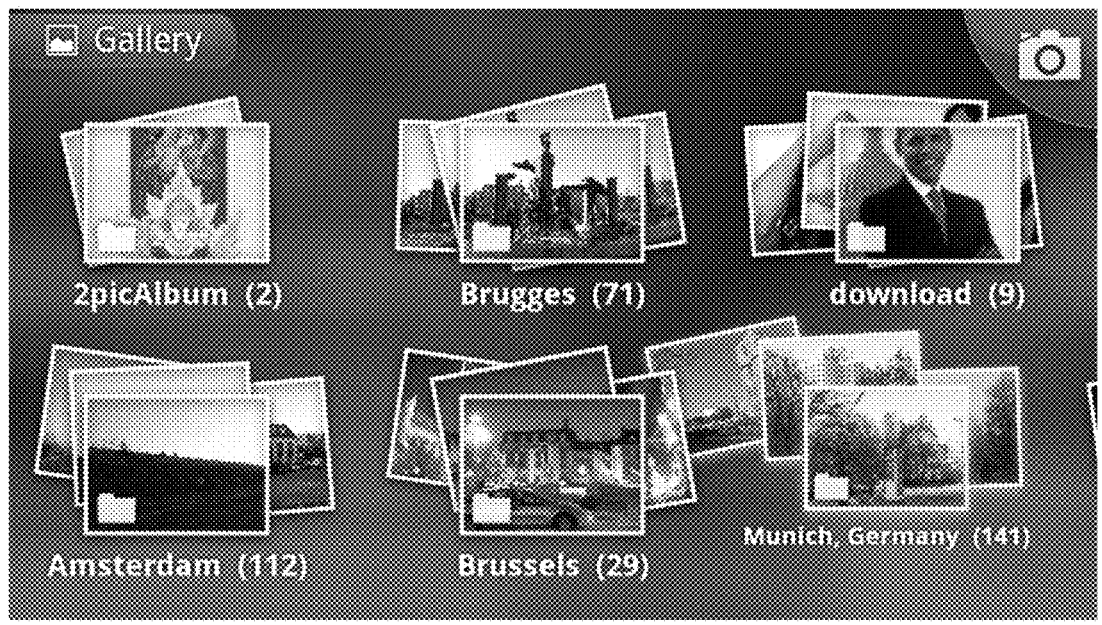
FIG. 17 shows a screenshot of a stack (Munich, Germany) whose thumbnails have been "spread out" due to a user pressing down on the stack (landscape orientation), according to one embodiment of the invention.

Stack feedback and spread animation—When a user presses down on a stack (either an album stack or a cluster stack), the user receives tactile feedback from the device. The tactile feedback gets stronger if the user presses down for a longer time. Eventually, if the press is long enough, multi-select mode will be entered (described above). Also, when a stack is pressed, the stack appears to move downwards (as if it had been physically pressed), and the thumbnail images in the stack spread out a bit to give the user a better idea of what is contained in the stack. FIG. 17 shows a screenshot of a stack (Munich, Germany) whose thumbnails have been "spread out" due to a user pressing down on the stack (landscape orientation).

10. Adaptive Backgrounds and Depth Effects

The following effects apply to album mode, grid mode, and cluster mode:

In album mode and cluster mode, the background starts with a filtered version of the top item of the leftmost visible stack (Gaussian blur 10 px, saturation −35, brightness −35). If the top item of the leftmost visible stack is not yet loaded, then the background starts with a filtered version of the icon for the gallery application. The image is cropped and zoomed to be wider than the display. When scrolling, the background moves with a parallax effect inspired by the Android home screen. When the edge of the background image is reached, it smoothly fades into the next background image. Alternatively, a single background image such as a dark gradient or wood grain can be used.

Darkened Gaussian Box Blur—In album mode and cluster mode, we pick the top item in the leftmost visible stack. In grid view, we pick the center image in the visible range. We then compute a box blur of that image. (A box blur is an image filter in which each pixel in the resulting image has a value equal to the average value of its neighboring pixels in the input image—the 10 neighboring pixels in our case.) We then darken the image by a constant amount (just subtract RGB values).

Stitching—We then stitch 2 backgrounds together as the user scrolls to create a continuous effect. In portrait orientation, a background image represents 2 columns. In landscape orientation, the background image represents 3 columns. 75% of the image is as-is. In the last 25% of the image, we add an alpha ramp to go from opaque to transparent. The next background image is then stitched after that.

Cross-Fading Animation—When scrolling, the background image will change every 2-3 columns. We cross-fade between the existing and the to-be-displayed background over some time duration (e.g., half a second).

Parallax Effect—The background scrolls at half the speed of the content, similar to the Android main page, to give prominence to the foreground.

The adaptive backgrounds are useful for giving the user a quick sense of the mood of the albums/clusters/content items being viewed and help make the background less dull.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a tangible computer-readable (or machine-readable) storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the present invention as described herein, and any references to specific languages are provided for disclosure of enablement and best mode of the present invention.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

In addition, the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

We claim:

1. A method comprising:
   displaying, by a processor, a plurality of images in a stack mode, wherein the images are divided into groups, and wherein a group is represented by a stack of images, where an image for a first content item is at a top of the stack and oriented parallel to an edge of a display, and subsequent images in the stack are centered a random amount away from a center of the image for the first content item and subsequent images in the stack are rotated a random amount relative to the image for the first content item;
   receiving, by the processor, a first user input that indicates a first stack that represents a first group of images; and
   in response to receiving the first user input, displaying, by the processor, the first group of images in a grid mode, wherein the images in the first group are displayed in a grid of one or more rows and one or more columns.

2. The method of claim 1, wherein the first user input comprises a single tap or click on the first stack.

3. The method of claim 1, wherein displaying the first group of images in the grid mode comprises animating a position of an image from the stack of images so that the image moves from within the stack to within the grid of rows and columns.

4. The method of claim 1, further comprising:
   receiving a second user input that indicates a first image; and
   in response to the second user input, presenting a content item represented by the first image.

5. The method of claim 4, wherein the second user input comprises a single tap or click on the first image.

6. The method of claim 4, wherein the content item is a static image.

7. The method of claim 4, wherein the content item is a video.

8. The method of claim 1, further comprising:
   receiving a second user input that comprises a tilting of a device that is displaying the first group of images in the grid mode; and
   in response to the second user input, displaying the grid of rows and columns with perspective distortion.

9. The method of claim 1, further comprising:
   receiving a second user input; and
   in response to the second user input, animating a position of the grid of rows and columns so that the grid scrolls.

10. The method of claim 9, wherein the second user input comprises a swipe gesture or a flick gesture.

11. The method of claim 9, further comprising providing user feedback when an edge of the grid has been reached.

12. The method of claim 11, wherein the user feedback comprises displaying the grid of rows and columns with perspective distortion.

13. The method of claim 11, wherein the user feedback comprises animating the grid of rows and columns so that the grid bounces off an edge of a display screen that is displaying the grid.

14. The method of claim 11, wherein the user feedback is tactile.

15. A method comprising:
   displaying, by a processor, a plurality of images;
   receiving, by the processor, a user input that indicates scrolling;
   in response to receiving the user input, scrolling, by the processor, the displayed plurality of images at a rate based on the user input and scrolling, by the processor, a background on which the plurality of images are displayed at a rate less than the rate at which the displayed plurality of images are scrolled;
   in response to receiving the user input, determining, by the processor, whether a last image is being displayed; and
   in response to the last image being displayed, displaying, by the processor, the last image such that the last image is tilted away from a plane of a screen displaying the last image.

16. The method of claim 15, further comprising in response to the last image being displayed, animating the last image so that the last image bounces off an edge of the screen that is displaying the last image.

17. The method of claim 15, further comprising in response to the last image being displayed, providing tactile feedback.

18. A non-transitory computer-readable storage medium storing computer program code for execution by a processor for performing a method, the method comprising:
   displaying, by the processor, a plurality of images in a stack mode, wherein the images are divided into groups, and wherein a group is represented by a stack of images, where an image for a first content item is at a top of the stack and oriented parallel to an edge of a display, and subsequent images in the stack are centered a random amount away from a center of the image for the first content item and subsequent images in the stack are rotated a random amount relative to the image for the first content item;

receiving, by the processor, a first user input that indicates a first stack that represents a first group of images; and in response to receiving the first user input, displaying the first group of images in a grid mode, wherein the images in the first group are displayed in a grid of one or more rows and one or more columns.

19. A non-transitory computer-readable storage medium storing computer program code for execution by a processor for performing a method, the method comprising:

displaying, by the processor, a plurality of images;

receiving, by the processor, a user input that indicates scrolling;

in response to receiving the user input, scrolling, by the processor, the displayed plurality of images at a rate based on the user input and scrolling, by the processor, a background on which the plurality of images are displayed at a rate less than the rate at which the displayed plurality of images are scrolled;

in response to receiving the user input, determining, by the processor, whether a last image is being displayed; and in response to the last image being displayed, displaying, by the processor, the last image such that the last image is tilted away from a plane of a screen displaying the last image.

\* \* \* \* \*